WYCHE & DICKSON.

Mill-Feed Regulator.

No. 79,620.

Patented July 7, 1868.

Witnesses:

Inventor:

United States Patent Office.

WILLIAM E. WYCHE AND YOUNG P. DICKSON, OF BROOKVILLE, NORTH CAROLINA.

*Letters Patent No. 79,620, dated July 7, 1868.*

IMPROVED HOPPER-SHOE FOR GRIST-MILLS.

*The Schedule referred to in these Letters Patent and making part of the same.*

TO ALL WHOM IT MAY CONCERN:

Be it known that we, WILLIAM E. WYCHE and YOUNG P. DICKSON, of Brookville, in the county of Granville, and State of North Carolina, have invented a new and improved Hopper-Shoe for Grist-Mills; and we do hereby declare that the following is a full, clear, and exact description thereof, which will enable others skilled in the art to make and use the same, reference being had to the accompanying drawings, forming part of this specification.

Similar letters of reference indicate corresponding parts.

Figure 1:
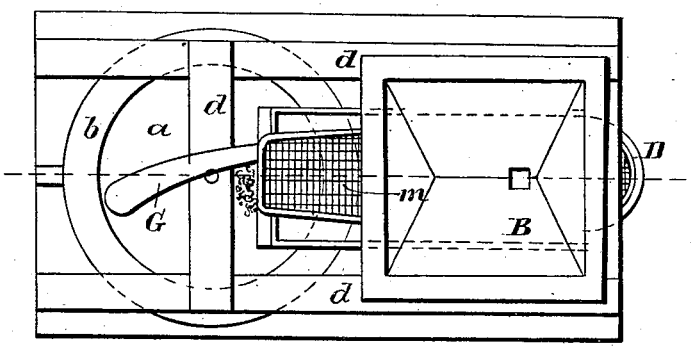
Figure 1 is a plan view of my invention.

This invention relates to an attachment for grinding-mills, and is designed to sift or separate the trash and other foreign matter from grain before it enters the hopper.

It consists of vibrating-sieves, hung above an inclined apron, and both actuated by some suitable mechanism, forming part of the mill-machinery, as will hereinafter be more fully set forth.

In the drawings, $a$ is the upper millstone, within a hoop, $b$, as ordinarily made. $d$ is the general frame, upon which is placed a hopper, B. Immediately under the hopper is a sifting-shoe, D, made with two sieve-surfaces, $m$ and $n$. The upper sieve, $m$, is of coarse wire, with meshes or spaces just sufficiently large to permit the passage of corn through it, though retaining the pieces of cob or other substances larger than grains of corn.

The lower sieve, $n$, is of finer texture as to its meshes, and permits the passage through it of the chaff, dust, dirt, &c., but retains the corn, which latter is shaken out through the opening H, at the end of the shoe, and between the upper and lower sieves. Beneath the shoe is an apron, E, for conducting away the chaff, dirt, &c., that escapes through the lower sieve.

The upper sieve is horizontal, and slightly concave, and is stretched across a frame, to which latter a rattle-staff, G, is attached, in the manner shown. This rattle-staff is for the purpose of imparting a vibrating motion to the shoe, when the said staff is agitated by a projection on the vertical shaft, on which the upper millstone is hung. The lower sieve is also attached to the same frame as the upper sieve, but is made more concave, to form an inclined trough, in the manner shown.

Figure 2:
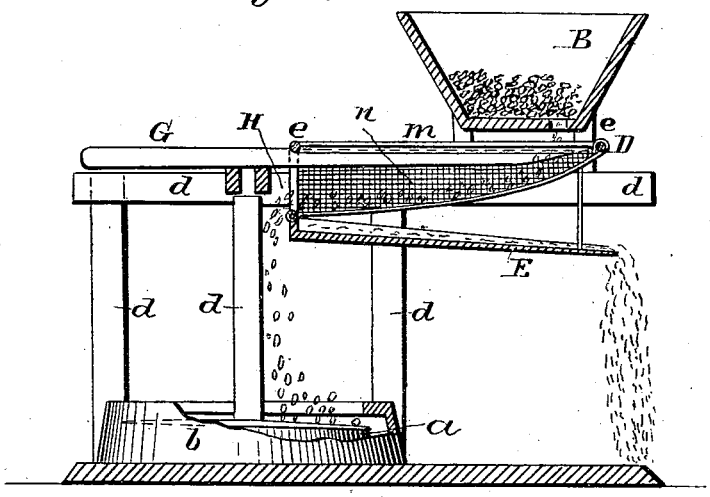
Figure 2 is a central vertical section of the same through the line $x\ x'$, fig. 1.

By the incline, represented in fig. 2, the grain is shaken out at the opening H, at the end of the shoe, and thus falls into the stone below.

When wheat or other small grain is being ground, a sheet of tin, conforming to the shape of the lower sieve, is placed therein, to prevent the escape of a portion of such small grain through the meshes of the said sieve.

In operation, the corn is placed in the hopper, from whence it passes, as shown, on to the upper sieve. It passes through the said sieve, leaving the pieces of cob, and other substances which are too large to pass through the sieve, and are shaken off by the vibration of the shoe.

The corn, then, is shaken out, through the opening H, into the stones, leaving the chaff, dust, &c., to pass off by the apron E, as before mentioned.

Being simple, cheap, and efficient, it is a valuable attachment for grist-mills, and generally applicable to the mills now in use.

We claim as new, and desire to secure by Letters Patent—

The shoe D, formed of two sieves, $m$ and $n$, in combination with the apron E, substantially as shown and described, and for the purpose specified.

WILL. E. WYCHE,
YOUNG P. DICKSON.

Witnesses:
  A. MORRIS,
  J. A. MORRIS.